United States Patent

Keunecke et al.

Patent Number: 5,906,926
Date of Patent: May 25, 1999

[54] METHOD FOR MODIFIED MANUFACTURE OF CELLULOSE CARBAMATE

[75] Inventors: Gerhard Keunecke, Pulheim, Germany; Henryk Struszczyk, Zgierz, Poland; Wlodzimierz Mikolajczyk, Lodz, Poland; Pawel Starostka, Lodz, Poland; Alojzy Urbanowski, Lodz, Poland

[73] Assignees: Zimmer Aktiengesellschaft, Germany; Instytut Wlokien Chemicznych, Poland

[21] Appl. No.: 08/969,481

[22] Filed: Nov. 13, 1997

[30] Foreign Application Priority Data

Apr. 15, 1997 [DE] Germany ............ 197 15 617

[51] Int. Cl.⁶ .................................. C08B 15/06
[52] U.S. Cl. .................. 435/101; 536/30; 536/32
[58] Field of Search .............. 536/30, 32; 435/101, 435/913, 945

[56] References Cited

U.S. PATENT DOCUMENTS

| | | | |
|---|---|---|---|
| 2,134,825 | 11/1938 | Hill et al. | 536/30 |
| 4,404,369 | 9/1983 | Huttunan et al. | 536/30 |
| 5,378,827 | 1/1995 | Keunecke et al. | 536/30 |

FOREIGN PATENT DOCUMENTS

| | | |
|---|---|---|
| 0057105 | 12/1985 | European Pat. Off. |
| 0097685 | 9/1986 | European Pat. Off. |
| 0178292 | 6/1989 | European Pat. Off. |
| 0402605A3 | 12/1990 | European Pat. Off. |
| 0402707 | 12/1990 | European Pat. Off. |
| 3508611 C2 | 11/1988 | Germany |
| 298789 A5 | 3/1992 | Germany |
| 160866 | 4/1993 | Germany |
| 160863 | 11/1993 | Germany |
| 163049 | 2/1994 | Germany |
| 4443547C1 | 5/1996 | Germany |
| 159085 | 11/1992 | Poland |
| 165916 | 3/1995 | Poland |

*Primary Examiner*—Herbert J. Lilling
*Attorney, Agent, or Firm*—McDonnell Boehnen Hulbert & Berghoff

[57] ABSTRACT

A method for the manufacture of cellulose carbamate, whereby cellulose pulp is preliminarily activated by alkaline, hydrothermal and/or enzymatic treatment, then the activated cellulose pulp is mixed with aqueous urea solution, the water in the solution replaced with an organic reaction carrier, and thereafter the cellulose is reacted with urea in the liquid phase to yield cellulose carbamate, which is separated from the liquid medium and washed. The method results in uniform substitution and distribution of carbamate groups and in cellulose chain, which leads to good solubility of the cellulose carbamate in aqueous alkali solution as well as excellent spinnability for producing fibers, films, and other products.

28 Claims, No Drawings

METHOD FOR MODIFIED MANUFACTURE OF CELLULOSE CARBAMATE

BACKGROUND OF THE INVENTION

1. Field of the Invention

This invention relates to a modified process for the liquid phase synthesis of cellulose carbamate using more effective activators of the initial pulps, which process has utility in the manufacture of cellulose fibers, films, and other products.

2. Summary of the Related Art

For the production of regenerated cellulose products, it is known to use cellulose carbamate as a soluble cellulose compound instead of cellulose xanthate, whose use is problematic because of its toxicity and flammability and because of stringent environmental regulations.

Cellulose carbamate is obtained by heating a homogeneous mixture of cellulose and urea at a temperature above 110° C. either in the absence of a liquid medium (U.S. Pat. No. 2,134,825, EP-Patent 57 105, EP-Patent Application 402 707) or in the presence of an inert organic liquid (EP-Patent 97 685, U.S. Pat. No. 5,378,827). In the solid-phase process, the cellulose/urea mixture may contain 3 to 50 wt-% of biuret (DE-Patent 35 08 611). (As used herein, all values of wt % are based on cellulose.) However, these well-known methods for the manufacture of cellulose carbamate, both in solid or liquid phase, suffer from the disadvantage of having an insufficiently uniform distribution and substitution of carbamate groups in the cellulose chain, which negatively affects the solubility behavior, the solution properties, and the spinnability of the cellulose carbamate, as well as the properties of the regenerated products. Furthermore, the distribution of urea intercalated into the cellulose structure is not sufficiently uniform, which negatively affects the cellulose carbamate properties, especially its solubility as well as the stability and spinnability of its solution.

For the dry-phase cellulose carbamate process, several methods of preliminary activation of the cellulose pulp have been proposed, for example with ammonia (Polish Patent 160 863), with inorganic or organic salts (U.S. Pat. No. 2,134,825, Polish Patents 160 866 and 163 049), with alkalihydroxide (U.S. Pat. No. 2,134,825), which is thereafter washed-out (EP-Patent 178 292) and/or neutralized by an acid (EP-Patents 402 605 and 402 707) such as carbonic acid (Polish Patent 165 916), with water at 100 to 170° C. and hyperbaric pressure (DD-Patent 298 789), or with enzymes and optionally thereafter ammonia (Polish Patent 159 085).

None of these known activation methods apply to cellulose, which is thereafter converted in the liquid phase. The solubility and spinnability of cellulose carbamate obtained by a liquid-phase process may, however, be improved by treating the carbamate with diluted aqueous acid, like 1N hydrochloric acid at a temperature above 100° C. under autogeneous pressure (DE-Patent 44 43 547).

All the well-known methods for the manufacture of cellulose carbamate fail to use sufficient effective activators of cellulose pulps to obtain all the properties of cellulose carbamate required to reach fiber and foil-grade level of this product. Accordingly, new and improved methods of producing cellulose carbamate are desirable.

SUMMARY OF THE INVENTION

The object of this invention is to manufacture cellulose carbamate by reaction of urea with cellulose in the liquid phase, wherein the cellulose pulp is preliminarily activated to reach a reactivity suitable to prepare the product with uniform substitution and distribution of carbamate groups in the cellulose chain, which guarantees its good solubility in aqueous alkali as well as its spinnability to produce fibers, films, and other products with suitable mechanical and processing properties.

This object is achieved by preliminary activation of cellulose pulp with alkaline or hydrothermal and/or enzymatic treatment of the cellulose pulp, intercalation with urea in aqueous solution, optionally evaporating a portion of the water, exchanging the water with a liquid organic solvent, reacting the cellulose with the urea in the liquid organic solvent, and separating out the cellulose carbamate product. The details of the foregoing method are described in more fully below.

The foregoing merely summarizes certain aspects of the invention and is not intended, nor should it be construed, as limiting the invention in any manner. All patents and other publications recited herein are hereby incorporated by reference in their entirety.

DETAILED DESCRIPTION OF THE PREFERRED EMBODIMENTS

The present invention comprises a method of manufacturing cellulose carbamate according to the claims, which is characterized in that highly reactive cellulose pulp is produced by preliminary activation followed by intercalation with urea in aqueous solution into the activated cellulose at 20 to 60° C. for 10 min to 6 h with a mole ratio of urea to anhydroglucose unit of 0.25:1 to 3:1. Thereafter, part of the water is optionally evaporated by drying under atmospheric or reduced pressure at a temperature in the range of 20 to 100° C., and the remaining water is exchanged by a liquid organic medium such as toluene, o-xylene, p-xylene, pseudocumene, tetraline or decaline. The reaction of the activated cellulose with the urea in the liquid organic medium is carried out at 80 to 180° C. for 10 min to 10 h. The reaction product is then separated from the liquid medium, washed out using a lower alcohol and/or warm and cold water, the residual liquid organic medium stripped out with steam, and the cellulose carbamate thereby obtained optionally dried.

The preliminary activation is conducted by alkaline or hydrothermal and/or enzymatic treatment of the cellulose pulp.

For the alkaline activation, the cellulose pulp is treated with 10–20 wt. % aqueous sodium hydroxide solution for 10 min to 10 h at 10 to 60° C. followed by aging for 10 min to 30 h at 20 to 80° C. The excess sodium hydroxide is then washed out and/or neutralized to obtain a sodium hydroxide content in the cellulose of below 5 wt. %, preferably 0.1 to 2 wt. %, wherein before, during, or after neutralization or after washing 0.001 to 10 wt. % (based on cellulose) of an activator consisting of organic nitrogen containing compounds, such as biuret, melamine, guanidine and/or their salts, and salts of organic and/or inorganic acids such sodium acetate, sodium formiate, sodium propionate, sodium oxalate, sodium sulfate, sodium chloride, sodium nitrate and/or sodium carbonate, are added to the activated cellulose.

According to a preferred embodiment of the invention, the alkaline activated pulp, optionally washed out, is neutralized by organic and/or inorganic acids in form of solutions, emulsions, and/or dispersions, such as acetic, formic, propionic, oxalic, sulfuric, hydrochloric or nitric acid, or by organic and/or inorganic acid anhydrides, such as acetic acid anhydride, carbon dioxide, sulfur dioxide or nitrogen dioxide.

The alkaline treatment of the cellulose produces alkaline-activated cellulose pulp with controlled reactivity toward urea and controlled polydispersity of less than 2.7, preferably 2.3. The polydispersity was determined by size-exclusion or gel chromatography using a universal calibration method in accordance with the Mark-Houwink equation $[\eta]=3.40\times10^{-4}\times M^{0.85}$.

For hydrothermal activation, the cellulose pulp is treated with water in the presence of catalysts for 0.5 to 10 h at 120 to 160° C. under a pressure of up to 5 bar using a weight ratio of cellulose to water of from 1:10 to 1:60.

According to a preferred embodiment of the invention, the catalysts are organic and/or inorganic acids in form of solutions, dispersions and/or emulsions, such as succinic, citric, formic, acetic, propionic, and sulfuric acid in an amount of 0.001 to 0.1 wt. % or salts in the form of solutions, dispersions and/or emulsions such as cobalt acetate, zinc acetate, ammonium sulfate, cobalt sulfate, ammonium acetate, and hydroxylamine sulfate, in an amount of 0.001 to 5.0 wt. %.

The catalytic hydrothermal treatment of the cellulose produces activated pulp with controlled polydispersity of less than 2.7.

For enzymatic activation, the cellulose pulp is pretreated mechanically and/or hydrothermally and/or by bleaching. Then the pretreated pulp is enzymatically activated by such enzymes as cellulases and/or hemicellulases, at 20 to 60° C. for 1 min to 48 h, statically and/or dynamically, with a cellulose concentration in the treated solution in the range of 0.1 to 20 wt. %. The enzymatic solution is thereafter washed out, and the residues of the enzymes are deactivated by heating to 80 to 90° C.

According to a preferred embodiment of the invention, the enzymes used for the activation of the cellulose pulp are a) cellulases originated from *Aspergillus niger* or from *Trichoderma reesei*, with an activity of CMC in the range of 0.1 to 30 U/ml, an activity of FPA in the range of 0.01 to 5 U/ml, and with a CMC to FPA activity ratio in the range of 1 to 100, b) hemicellulases with an activity of 0.1 to 50 U/ml, or c) a mixture of cellulases and hemicellulases in the weight ratio 1:0.1 to 1:10.

According to an embodiment of the invention, the mechanical pretreatment of the cellulose pulp subjected to the enzymatic activation is carried out by mixing, shredding or grinding of the pulp in water for 10 min to 5 h at 20 to 90° C. According to another embodiment of the invention, the hydrothermal pretreatment of the cellulose pulp subjected to the enzymatic treatment is carried out in the presence of water with a weight ratio of cellulose to water of from 1:5 to 1:100 for 10 min to 6 h at 110 to 150° C. under a pressure of up to 5 bar. According to another embodiment of the invention, the bleaching of the cellulose pulp subjected to the enzymatic treatment is carried out using hydrogen peroxide at a concentration of 0.1 to 10 g/l at 20 to 95° C. for 10 min to 6 h, and thereafter the pretreated cellulose pulp is washed out. The pretreatment of the cellulose pulp is carried out by one of these three methods or by a combination of at least two of these methods, such as mechanical and hydrothermal, hydrothermal and mechanical, or mechanical, hydrothermal and bleaching.

The enzymatic treatment of the cellulose pulp produces activated pulp with controlled reactivity toward urea and controlled polydispersity of less than 2.7.

The cellulose pulp, which has been activated as described previously and which has a degree of polymerization in the range of 200 to 1200, preferably 300 to 600, is then mixed for 10 min to 6 h with a 20 to 60 wt. % aqueous urea solution at 20 to 60° C. The molar ratio of urea to anhydroglucose units is preferably from 0.25:1 to 3:1, whereby a nearly stoichiometric ratio is more preferred. In a preferred embodiment of the invention, the cellulose is suspended in an excess of aqueous urea solution and then a portion of the urea solution is mechanically squeezed from the suspension. The separation of the solution can take place, for example, up to a pressure factor of about 2 to 3, i.e., the remaining product contains 2 to 3 parts urea solution for 1 part of cellulose. However, the applied pressure factor depends on the concentration of the urea solution.

Thereafter some of t he water of the cellulose an d urea mixture is optionally removed by pre-drying the mixture under atmospheric or reduced pressure at 20 to 100° C. This pre-drying step is not critical for the further conversion to cellulose carbamate, but makes the process more economical.

The remaining water or, if no pre-drying was performed, all of the water of the cellulose/urea mixture is then exchanged with a liquid organic solvent (also called herein the "reaction carrier"). The exchange is preferably conducted by adding the organic reaction carrier to the mixture and then evaporating the water together with a portion of the reaction carrier under atmospheric and/or reduced pressure. The evaporated mixture of water vapor and organic solvent vapor corresponds in its composition to the respective vapor pressures of the components. With the evaporation of the water, urea that has been dissolved is left behind in solid form in the cellulose. A suspension of cellulose containing finely distributed urea therein in the liquid organic reaction carrier is obtained.

Subsequently, the cellulose/urea/liquid organic solvent mixture is converted in the presence of an inert gaseous carrier to cellulose carbamate by heating to 80 to 180° C., preferably at least at the end of the conversion to 130 to 180° C., for 10 min to 10 h. The pressure is preferably in the range of 0.05 to 5 bar (abs.). The inert gaseous carrier is produced by boiling the reaction carrier, which, in the gaseous or vapor state, carries off the ammonia formed during the reaction. The gaseous carrier and the reaction carrier are chemically identical in this case. In another version of the invention, an inert gaseous carrier is fed into the liquid reaction carrier from an external source. In this case, the gaseous carrier and the reaction carrier are chemically different, and it is not necessary to work at the boiling point of the organic solvent. The inert gas serves as a transport gas for the ammonia produced. Suitable inert gases are, e.g., nitrogen, argon and gaseous hydrocarbons, such as methane, ethane, propane, and mixtures thereof. The molar ratio of inert gas to the ammonia is in the range 1:1 to 5:1.

Thereafter, the cellulose carbamate product thereby produced is removed from the liquid medium, washed out using a lower alcohol and/or warm and cold water, the residual organic solvent stripped out with steam, and the cellulose carbamate thereby obtained optionally dried. The recovery of the cellulose carbamate can be executed as described in U.S. Pat. No. 5,378,827 or in DE Application 44 17 410.

The cellulose carbamate recovered from the washing step can be processed without further purification into a solution for the production of regenerated cellulose products, like films, fibers, or other shaped articles by to art recognized method.

The method according to the invention allows one to obtain a fiber-grade cellulose carbamate characterized by a uniform distribution and substitution of carbamate groups in the cellulose chain, which results in excellent solubility in aqueous alkali solution to yield a solution with high stability and acceptable viscosity. Cellulose carbamate synthesis in the liquid phase using the highly reactive cellulose pulps prepared by activation according to the present invention allows one to obtain a suitably uniform distribution of urea intercalated into the activated cellulose structure affecting on their reactivity in liquid phase. The methods of the present invention also produce cellulose carbamate with suitable alkali solution properties, which include a concentration of α-cellulose up to 10 wt. %, stability in a temperature range between 0° C. and 15° C. for 72 h up to 120 h, and spinnability to form fibers and foils with acceptable mechanical and processing properties. A main advantage of the method according to the invention is the possibility to obtain a fiber-grade cellulose carbamate suitable to produce fibers and foils by using a liquid-phase synthesis with application of activated, highly reactive cellulose pulps.

The use of the highly reactive cellulose pulps according to the invention allows reduction of the energy of hydrogen bonds, thereby effecting such types of structural changes as molecular, super-molecular and morphological. The intercalation of urea into the cellulose structure is more uniform and much better than with known methods.

At the same time, the reactivity of the cellulose pulps activated according to the invention guarantees uniform substitution of carbamate groups into the cellulose chains, which positively influences the properties and behavior of the synthesized cellulose carbamate, especially its solution properties and behavior (including stability and spinnability). The highly reactive cellulose pulps used for reaction with urea in liquid phase according to the invention allow production of cellulose carbamate with improved properties and behavior, especially solubility, solution properties and spinnability. The advantage of the method according to the invention is also connected with the pre-drying of the reactive urea-intercalated cellulose pulp. This pre-drying reduces the synthesis time of the cellulose carbamate with simplification of the reaction apparatuses.

Alkaline activation according to the invention produces highly reactive pulps with a controlled degree of polydispersity of less than 2.7, preferably 2.3, whereas the initial pulps are characterized by a value of this parameter of not lower than 3.5. The degree of polydispersity of cellulose pulps activated according to well-known methods are not lower than 3.0. Alkaline treatment according to the invention is carried out in presence of activators effecting the controlled activation of the cellulose pulps. These activators are, according to one embodiment of the invention, nitrogen containing organic compounds, such as biuret, melamine, guanidine and/or their salts. These activators act during the uniform intercalation of the urea in the cellulose structure as well as during the cellulose carbamate synthesis.

According to another embodiment of the invention, the activators are also the salts of organic and/or inorganic acids, like sodium acetate, sodium propionate, sodium sulfate, sodium carbonate. These activators act in the liquid phase during synthesis mainly by controlling the cellulose pores (in particular their size, dimension, and distribution during the intercalation of urea into the cellulose structure). A uniform urea distribution is thereby obtained. At the same time, during the synthesis of cellulose carbamate in liquid phase, these activators also act on the uniform substitution of the carbamate groups. According to the invention, the activators are introduced before, during, or after the neutralization of the alkali-cellulose by organic and/or inorganic acids and/or their anhydrides.

Hydrothermal activation in the presence of catalysts according to the invention produces highly reactive pulps with a controlled degree of polydispersity of less than 2.7. The hydrothermal treatment of cellulose pulps according to the invention is carried out in the presence of catalysts such as organic and/or inorganic acids as well as inorganic or organic salts of inorganic and/or organic acids, which controls the degradation and activation process. The controlled hydrothermal activation is carried out for a short time (in the range from 30 min to 10 h), producing pulps highly reactive toward urea and resulting in fiber-grade cellulose carbamate with uniform distribution of carbamate groups in the cellulose chain.

Enzymatic activation according to the invention produces highly reactive cellulose pulps with a controlled degree of polydispersity of less than 2.7. The enzymatic treatment is preceded by a suitable pretreatment to open the capillary system in the cellulose structure for enzyme penetration, e.g., mechanically, hydrothermally, and/or by bleaching. The enzymatic treatment of cellulose pulps mainly causes degradation of polymer as well as its activation by weakening of hydrogen bonds (both inter- and intramolecular) resulting in better penetration of the urea during the intercalation process as well as uniform distribution in the cellulose structure. At the same time, the availability of hydroxyl groups in the cellulose chains increases their reactivity toward urea.

The advantages of this activation method include short treatment time, low process temperature, as well as the elimination of the release of by-products during the process. The most effective range of cellulases and/or hemicellulases are used according to the invention.

The following examples are offered for illustrative purposes only and are not intended, nor should they be construed, as limiting the invention in any manner. Those skilled in the art will appreciate that modification and variations of the following examples can be made without exceeding the spirit or scope of the invention.

EXAMPLES

The characteristic values given in the following examples and in the description were determined as follows:

Polydispersity (Pd) by size-exclusion chromatography using a Hewlet-Packard HP-1050 analyzer with a refractometric detector HP 1047 A and columns with a mixture of PL Gel B 10 $\mu$m (600 mm) from Polymer Lab. and polystyrene standards, at a column temperature of 80° C. with dimethyl acetamide containing 0.5 wt. % LiCl as solvent.

Degree of polymerization ($DP_w$) by viscosimetry using a complexsolution of sodium-iron-(III) tartrate as described in "Das Papier 12 [1958] 187."

Crystallinity index (CrI) by X-ray analysis as described in "Textile Research Journal 29 [1959] 786."

Water retention value (WRV) as described in "Cellulose Chemistry and Technology 11 [1978] 633."

Energy of hydrogen bonds ($E_H$) by infra-red spectroscopy as described in "Cellulose Chemistry and Technology 7 [1973] 153."

Nitrogen content according to the Kjeldahl method as described in "Chemia Analityczna (Poland) 5 [1960] 1039."

α-Cellulose content according to the Polish branch standard No. ZN-70/MPCh-WS-8.

Sodium hydroxide content according to the Polish branch standard No. ZN-70/MPCh-WS-85.

Viscosity of the cellulose carbamate solution with an Ubbelohde viscosimeter according to the Polish branch standard No. MB/WS-58/1.22.04.

Ripeness degree of the cellulose carbamate solution according to the Polish branch standard No. MB/WS-58/1.22.031 with use of ammonium hydrogen carbonate however.

Clogging value or filter value ($K_W^*$) according to the Polish branch standard No. BN-70/7516-03.

Solubility degree of cellulose carbamate: The solution of 5 wt. % polymer (cellulose carbamate) in a 9 wt. % aqueous sodium hydroxide solution was stored at 10 to 12° C. for 24 hours and then analyzed at ambient temperature using light absorption at a wave length of 400 μm, intensity of light diffusion, viscosity (at 20° C.), as well as by microscopic inspection. According to the results, the solubility degree was qualitatively assigned, where 0 corresponds to insoluble and 5 to excellent solubility.

CMC enzymatic activity as described in "Method for measuring enzyme activities" edited by the Finnish Sugar Co. Ltd., Biochem Division, Finland: 1.0 ml of the enzyme and 1.0 ml of a 0.5% (weight/volume) carboxymethylcellulose (CMC) solution, both in a 0.05N sodium acetate buffer with pH=4.8, were mixed and incubated at 50° C. for 10 min. After addition of 3.0 ml of a 1 wt. % dinitrosalicylic acid solution, the mixture is boiled for 5 min, and after cooling the light absorption at 540 nm of this sample is measured against reagent blank. The evaluation is made by means of a standard curve, whereby 1 CMC activity unit per ml (U/ml) corresponds to 1 μmol of reducing sugar, expressed as glucose equivalents, liberated in 1 minute.

FPA enzymatic activity (filter paper activity): 50 mg of a Whatman No. 1 filter paper (size about 59×10 mm) in 1.0 ml of 0.05N sodium acetate solution (pH=4.8) at 50° C. and 1.0 ml of the enzyme in 0.05N sodium acetate buffer with pH=4.8 were mixed and incubated at 50° C. for 60 min. After addition of 3.0 ml of a 1 wt. % dinitrosalicylic acid solution, the mixture is boiled for 5 min, and after cooling analyzed in the same way as for the CMC activity. 1 FPA activity unit per ml (U/ml) corresponds to 1 μmol of reducing sugar, expressed as glucose equivalents, liberated in 1 minute.

In the following examples, technical grade urea with a nitrogen content of 46.3 wt. % and a melting temperature of 131° C. was used. All other chemicals were of pure grade.

Example 1

0.25 weight parts of cellulose pulp of Alicell (Canadian sulfite pulp from spruce wood) (average degree of polymerization of $DP_W$=676, crystallinity index of CrI=67.8%, water retention value of WRV=43.3%, energy of hydrogen bonds of $E_H$=13.9–21.4 kJ/mol, polydispersity of Pd=3.19 and moisture content of 8 wt. %) in sheet form were introduced to the mercerization press with 75 volume parts of 18 wt. % aqueous sodium hydroxide solution at 45° C. The alkalization was carried out for 60 min. at 42–45° C. Then the residual sodium hydroxide solution was removed and the mercerized cellulose sheets were pressed out.

The alkalicellulose obtained was transferred into the shredder, and its disintegration was carried out for 2 h. Disintegrated alkalicellulose was transferred to a ripenning tank, where a degradation process was carried out for 4 h at 40° C. 0.65 weight parts of the alkalicellulose thereby obtained (containing 35.4 wt. % of α-cellulose, 15.7 wt. % of sodium hydroxide and $DP_W$=331) was mixed in a tank equipped with a stirrer with 4 volume parts of water and 0.5 volume parts of 80% acetic acid for 1 h. Then the activated cellulose pulp dispersion was filtered.

0.822 weight parts of wet activated cellulose obtained (characterized by $DP_W$=338, CrI=64.0%, WRV=90.0%, Pd=1.91, $E_H$=11.5–14.6 kJ/mol) were introduced into a mixer together with 1.868 volume parts of water and 0.510 weight parts of urea for its intercalation into the cellulose structure. The intercalation process was carried out for 1 h at 40° C.

The cellulose pulp with intercalated urea thereby obtained was filtered and squeezed to obtain a final weight of 0.6 weight parts. This mixture of cellulose containing 62.9 wt. % intercalated urea were introduced into a reactor equipped with stirrer and reflux condensor containing 3.2 volume parts of o-xylene (b.p. 142–147° C.), and the content of the reactor was heated to and maintained at boiling with stirring at 100 rpm at 146° C. for 2 h. After synthesis, the excess o-xylene was filtered and squeezed out.

The technical cellulose carbamate were introduced again into a reactor containing 3.5 volume parts of water, and the residual o-xylene was stripped at 88° C. for 1.5 h. The product was then filtered and washed with warm and cold water and then dried at 50° C. for 12 h under a normal pressure. 0.22 weight parts of cellulose carbamate (white color, $DP_W$=309, nitrogen content of 1.6 wt. %, and very good solubility in 9 wt. % aqueous sodium hydroxide solution) were obtained. The relative solubility degree in a scale from 0 (insoluble) to 5 (excellent solublity) reached the best level (5).

The cellulose carbamate obtained with the same synthesis parameters as above on the base of Alicell pulp that was not subjected to the activation process was characterized by average polymerization degree of $DP_W$=493, nitrogen content of 2.7 wt. %, and poor solubility in 9 wt. % aqueous sodium hydroxide solution. The soluble part of said cellulose carbamate was equal only to 41% of the total weight of sample and the relative solubility degree was 2.

Example 2

0.25 weight parts of cellulose pulp of Ketchikan (from spruce wood) ($DP_W$=577, CrI=65.5%, WRV=65%, $E_H$=12.8–21.4 kJ/mol, Pd=3.51, and moisture content of 7 wt. %) in form of sheets were introduced to the mercerization as in Example 1 for 1 h using 3.5 weight parts of 18 wt. % aqueous sodium hydroxide at 42–45° C.

0.49 weight parts of alkalicellulose thereby produced (containing 34.3 wt. % of α-cellulose and 15.6 wt. % of sodium hydroxide) was disintegrated in a shredder for 2 h at a temperature from 29.5 to 37° C. After that the alkalicellulose was subjected to the aging process for 5 h at 39° C.

Alkalicellulose thereby obtained was transferred on the filtering funnel and washed with water to completely remove sodium hydroxide. Then the activated cellulose was squeezed to obtain 0.5 weight parts of wet activated cellulose (42 wt. % of α-cellulose, $DP_W$=358, CrI=61.1%, WRV=85% and Pd=2.37). This cellulose pulp was mixed in the shredder with 0.08 weight parts of urea for 1 h at 25° C.

The cellulose pulp containing intercalated urea was preliminarily dried at 50° C. for 12 h. 0.33 weight parts of cellulose intercalated with urea containing 64.6 wt. % of α-cellulose and 12.3 wt. % of moisture were introduced into a reactor as in Example 1 together with 4 weight parts of o-xylene (b.p. 142–147° C.). The reaction was carried out for 2 h at 146° C. The purification of the product was carried out as in Example 1. 0.23 weight parts of white cellulose carbamate were obtained. The product was characterized by $DP_W=380$, nitrogen content of 2.2 wt. %, and very good solubility in 9 wt. % aqueous sodium hydroxide. The solubility degree was the highest value (5).

Example 3

0.25 weight parts of cellulose pulp of Alicell with properties as in Example 1 were mercerized as in Example 1. 0.65 weight parts of the degraded alkalicellulose in the mixer were saturated with gaseous carbon dioxide for 1 h. The neutralized cellulose was added with 4 volume parts of water, mixed for 1 h, and then filtered. 0.85 weight parts of the wet activated cellulose ($DP_W=358$, CrI=61.1%, WRV=74.6%, Pd=2.37) were introduced into a mixer and 0.51 weight parts of urea were added together with 1.84 volume parts of water. The mixture was homogenized for 2 h at 40° C. The urea intercalated cellulose was filtered and transferred to a reactor as in Example 1.

The synthesis of cellulose carbamate was carried out for 1 h at 145° C. The process was conducted as in Example 1. 0.23 weight parts of white cellulose carbamate ($DP_W=368$, nitrogen content of 1.2 wt. % and very good solubility in 9 wt. % sodium hydroxide solution) was obtained. The cellulose carbamate had a solubility degree of 5.

Example 4

0.2 weight parts of cellulose pulp of Swiecie (Polish pulp from beech hard wood) ($DP_W=653$, WRV=69.6%, CrI=67.8%, Pd=3.04, $E_H$=12.87–24.24 kJ/mol and moisture content of 9 wt. %) were subjected to alkalization as in Example 2, except that the alkalicellulose aging was carried out at 39° C. for 10 h. Next, the alkalicellulose was treated in the shredder with 0.035 weight parts of anhydrous formic acid and 0.05 weight parts of urea, where the dispersion was mixed for 1 h at 30° C. The activated cellulose was characterized by $DP_W=350$, WRV=79.1%, CrI=64.2%, Pd=2.38 and $E_H$=11.5–17.9 kJ/mol. The urea-intercalated activated cellulose pulp was transferred into a reactor as in Example 1 with 3.2 volume parts of o-xylene, and the synthesis was carried out as in Example 1 for 2 h at 146° C. 0.18 weight parts of white cellulose carbamate were obtained and characterized by $DP_W=330$, nitrogen content of 2.1 wt. % and good solubility in 9 wt. % aqueous sodium hydroxide solution. The degree of solubility of the cellulose carbamate obtained was estimated to be 5.

Example 5

0.25 weight parts of cellulose pulp of Ketchikan (from spruce wood) in the form of sheets ($DP_W=608$, CrI=60.2%, WRV=48.6%, $E_H$=12.7–21.4 kJ/mol, Pd=3.82 and moisture content of 7 wt. %) were alkalized using 12 wt. % of aqueous sodium hydroxide for 1 h at 45° C. Then the alkalicellulose was squeezed to a press factor of 2.5 and disintegrated in the shredder for 2 h at 21–29° C. 0.62 weight parts of alkalicellulose with α-cellulose content of 37.5 wt. % and sodium hydroxide content of 8 wt. % were obtained.

The disintegrated alkalicellulose was transferred into a baratte, where gaseous sulfur dioxide were introduced for 2 h with continuous revolution of the baratte to obtain complete neutralization. 5.0 weight parts of water were added to the mixture, and after mixing for 30 min. the mixture was filtered.

0.72 weight parts of wet cellulose ($DP_W=350$, WRV=79.5%, CrI=67.0%, Pd=2.40) were transferred into the mixer together with 1.0 weight parts of urea and 1.48 weight parts of water and the intercalation was carried out with agitation for 1 h at 40° C. The urea-intercalated cellulose dispersion was filtered and squeezed out to finally obtain 0.6 weight parts of urea intercalated cellulose. This mixture was subjected to the synthesis of cellulose carbamate with parameters such as in Example 2. 0.230 weight parts of white cellulose carbamate with $DP_W=340$, nitrogen content of 2.4 wt. % and good solubility in 9 wt. % sodium hydroxide solution was obtained. This product was characterized by relative solubility degree of 4 to 5.

Example 6

0.25 weight parts of cellulose pulp of Ketchikan in the sheet form with properties as in Example 5 were subjected to mercerization as in Example 1 using 4.0 volume parts of 18 wt. % aqueous sodium hydroxide at 40° C. for 1 h. The alkalicellulose was pressed to a press factor of 2.5 and then disintegrated for 2 h at 20–40° C.

0.62 weight parts of disintegrated cellulose containing 37.5 wt. % of α-cellulose and 15.3 wt. % of sodium hydroxide were transferred into a shredder. 0.176 weight parts of propionic acid were added and the mixture was agitated for 1 h. Thereafter, 0.1 weight parts of urea were introduced and the mixture homogenized for 1 h. The activated cellulose was characterized by $DP_W=346$, WRV=80.1%, CrI=65.3% and Pd=2.6.

The urea-intercalated cellulose were introduced into a reactor and synthesis of cellulose carbamate was carried out as in Example 2 for 2 h at 146° C. 0.24 weight parts of white cellulose carbamate ($DP_W=350$, nitrogen content of 2.1 wt. % and good solubility in 9 wt. % sodium hydroxide solution) were obtained. This product was characterized by relative solubility degree of 4.

Example 7

0.25 weight parts of cellulose pulps of Ketchikan in form of sheets with properties as in Example 5 were mercerized as in Example 1. The disintegrated alkalicellulose was transferred into the shredder. 0.107 weight parts of oxalic acid were added, and the mixture was homogenized for 1 h. The neutralized cellulose was washed several times with water to obtain 0.01 wt. % of sodium oxalate included in the cellulose structure. The activated cellulose was characterized by $DP_W=338$, WRV=82.1%, CrI=63.0% and Pd=2.64.

This activated cellulose was transferred to the mixer and 0.1 weight parts of urea were introduced together with 1.0 volume parts of water. The intercalation process was carried out for 1 h at 30° C. and then the dispersion filtered to obtain 0.55 weight parts of wet mixture. This mixture were introduced into a reactor and synthesis of cellulose carbamate was carried out for 2 h at 146° C. as in Example 1. 0.245 weight parts of white cellulose carbamate ($DP_W=358$, nitrogen content of 2.5 wt. %, and good solubility in 9 wt. % of sodium hydroxide solution) were obtained. This product was characterized by relative solubility degree of 4.

Example 8

0.25 weight parts of Ketchikan cellulose pulp with properties as in Example 5 were mercerized as in Example 1. The disintegrated alkalicellulose was transferred to the shredder, and 0.232 weight parts of sulfuric acid with concentration of 49 wt. % were introduced into the alkalicellulose with homogenization for 2 h. The neutralized cellulose was washed several times to obtain activated cellulose containing 0.05 wt. % of sodium sulfate.

The activated cellulose ($DP_W$=360, WRV=77.5%, CrI=62.6% and Pd=2.70) and 0.1 weight parts of urea with 1.0 volume parts of water were introduced into the mixer. The mixture was homogenized for 1 h at 20° C. 0.60 weight parts of wet urea-intercalated cellulose were used for cellulose carbamate synthesis as in Example 1.

0.24 weight parts of white cellulose carbamate ($DP_W$=354, nitrogen content of 1.9 wt. % and very good solubility in 9 wt. % of sodium hydroxide solution) were obtained. This product was characterized by relative solubility degree of 4.5.

Example 9

0.25 weight parts of Ketchikan cellulose pulp (from spruce wood) ($DP_W$=577, WRV=65.5%, CrI=65% and Pd=3.51) were mercerized and prepared as in Example 1. The disintegrated cellulose were introduced into a shredder and 0.242 weight parts of hydrochloric acid solution with a concentration of 36 wt. % were added. The mixture was homogenized for 1 h. The neutralized cellulose was washed to obtain activated cellulose containing 0.005 wt. % of sodium chloride and having $DP_W$=350, WRV=78.3%, CrI=64.5% and Pd=2.7. The cellulose carbamate was synthesized as in Example 8. 0.243 weight parts of white cellulose carbamate ($DP_W$=360, nitrogen content of 2.2 wt. % and very good solubility in 9% sodium hydroxide solution) were obtained. This product had a relative solubility degree in a range of 4–5.

Example 10

0.25 weight parts of Ketchikan cellulose pulp in the sheet form characterized by properties as in Example 9 were mercerized as in Example 1. The disintegrated alkalicellulose was subjected to aging for 15 h at 40° C. and then neutralized by gaseous carbon dioxide. Activated cellulose containing 18 wt. % sodium carbonate ($DP_W$=338, CrI=61.4%, WRV=99%, Pd=1.99 and $E_H$=13.1 kJ/mol) was subjected to intercalation of 0.1 weight parts of urea and to synthesis to cellulose carbamate as in Example 2. 0.248 weight parts of white cellulose carbamate ($DP_W$=338, nitrogen content of 3.2 wt. % and relative solubility degree of 4–5) were obtained. The alkaline solution of the cellulose carbamate obtained was characterized by α-cellulose content of 5.50 wt. %, sodium hydroxide content of 9.08 wt. %, viscosity at 20° C. of 7 sec, ripeness degree of 16° H and filter value $K_W^*$=302.

Example 11

0.25 weight parts of Ketchikan pulp with properties as in Example 9 were mercerized as in Example 1, submitted to aging for 5 h at 40° C., and neutralized by 0.2 volume parts of 80% aqueous solution of acetic acid. This neutralized cellulose was washed several times to obtain the activated cellulose containing 0.1 wt. % of sodium acetate. This activated cellulose was characterized by $DP_W$=399, CrI=64.7%, WRV=92.2%, $E_H$=11.6 kJ/mol and Pd=2.18.

The intercalation of 0.1 weight parts of urea and the synthesis of cellulose carbamate were carried out as in Example 2. 0.25 weight parts of white cellulose carbamate ($DP_W$=455, nitrogen content of 3.3 wt. %, relative solubility degree of 4) were obtained. The alkaline solution of this product was characterized by α-cellulose content of 5.14 wt. %, sodium hydroxide content of 8.58 wt. %, viscosity at 20° C. of 48 sec, ripeness degree of 15° H and filter value $K_W^*$=420.

Example 12

0.25 weight parts of Ketchikan pulp with properties as in Example 9 were activated and intercalated with urea as in Example 11. The synthesis of cellulose carbamate was carried out as in Example 1 using pseudocumene (density 20/4=0.867 g/cm³; b.p. 166–169° C.) as the organic medium at 155° C. for 1 h. 0.246 weight parts of white cellulose carbamate ($DP_W$32 381, nitrogen content of 2.6 wt. % and relative solubility degree of 5) were obtained.

Example 13

0.25 weight parts of Ketchikan pulp with properties as in Example 9 were activated as in Example 11 with aging for 1 h at 40° C. The neutralization and washing was carried out as in Example 11. The activated cellulose was characterized by $DP_W$=405, WRV=77.3%, CrI=64.5%, Pd=1.94. This activated cellulose was intercalated by 0.1 weight parts of urea as in Example 2. The synthesis of cellulose carbamate for 4 h at 135° C. was carried out as in Example 1. 0.249 weight parts of white cellulose carbamate ($DP_W$=393, nitrogen content of 3.2 wt. % and relative solubility degree in a range of 4–5) were obtained.

Example 14

0.25 weight parts of Alicell pulp (Canadian sulfite pulp from spruce wood) with properties as in Example 1 were mercerized as in Example 1. The alkalicellulose obtained was squeezed to a press factor of 2.6. The alkalicellulose pulp was disintegrated at a temperature range of 25–45° C. in a shredder. The alkalicellulose was subjected to the aging process for 5 h at 40° C.

The disintegrated cellulose were introduced into a mixing tank containing 3.85 weight parts 3.8 wt. % acetic acid solution. After stirring for 1 h the dispersion was stored for 15 h at 20° C. The neutralized cellulose was squeezed to a press factor of 2.2. The activated cellulose obtained was characterized by $DP_W$=424, WRV=107.7%, CrI=60%, Pd=1.88 and $E_H$=6.0–17 kJ/mol.

The activated pulp was subjected to the urea intercalation process as in Example 12. The cellulose carbamate synthesis was carried out as in Example 1 for 2 h at 135° C. 0.248 weight parts of white cellulose carbamate ($DP_W$=369, nitrogen content of 2.8 wt. % and relative solubility degree of 5) were obtained. The alkaline solution of this product was characterized by 4.96 wt. % of α-cellulose content, 8.54 wt. % of sodium hydroxide, viscosity at 20° C. of 8 sec, ripeness degree of 22.5° H, and filter value $K_W^*$=304.

Example 15

The urea-intercalated Alicell cellulose pulp prepared as in Example 14 with properties as in Example 14 was predried at 80° C. for 18 min. to obtain a moisture content of 40 wt. %. Synthesis of cellulose carbamate was carried out as in Example 14. 0.24 weight parts of white cellulose carbamate ($DP_W$=319, nitrogen content of 2.7 wt. %, relative solubility degree of 5) were obtained. The alkaline solution of this product was characterized by 4.4 wt. % of α-cellulose, 8.5 wt. % of sodium hydroxide, viscosity at 20° C. of 8 sec, ripeness degree of 16.5° H, and filter value $K_W^*$=592.

Example 16

5.0 weight parts of cellulose pulps of Ketchikan with properties as in Example 5 were activated as in Example 1.

The wet, activated cellulose obtained ($DP_W$=370) were introduced into a mixer together with 1.85 weight parts of urea in water for intercalation under conditions as in Example 1. This mixture of urea-intercalated cellulose was pre-dried at 40° C. for 30 h to obtain a water content of 10.1 wt. %. The synthesis of cellulose carbamate was carried out as in Example 1. 4.9 weight parts of white cellulose carbamate ($DP_W$=328, nitrogen content of 3.3 wt. % and relative solubility degree of 5) were obtained. The alkaline solution of this product was characterized by 7.90 wt. % of α-cellulose content, 8.35 wt. % of sodium hydroxide, viscosity at 20° C. of 64 sec, ripeness degree of 16° H, and a filter value of 278.

Example 17

0.25 weight parts of Ketchikan cellulose pulp with properties as in Example 5 were mercerized by 18 wt. % aqueous sodium hydroxide solution for 1 h at 35° C. The alkalicellulose obtained was squeezed to a press factor of 2.5, then disintegrated for 2 h at 25–40° C. 0.64 weight parts of the alkalicellulose containing 36.6 wt. % of α-cellulose and 14.9 wt. % sodium hydroxide were transferred into a funnel and washed with water to remove all sodium hydroxide. After that, 0.75 weight parts of the wet activated cellulose ($DP_W$=350 and WRV=85%) were introduced into a mixer together with 0.01 weight parts of biuret (used as activator), 1.85 volume parts of water, and 0.6 weight parts of urea, and intercalation was carried out for 1 h at 40° C. The dispersion was filtered and squeezed to obtain 0.6 weight parts of wet, urea-intercalated cellulose pulp. This mixture were introduced to the reactor and synthesis of cellulose carbamate was carried out as in Example 1. 0.23 weight parts of white cellulose carbamate ($DP_W$=350, nitrogen content of 2.2 wt % and relative solubility degree in a range of 4 to 5) were obtained.

Example 18

0.25 weight parts of Ketchikan cellulose pulp with properties as in Example 5 were mercerized and washed as in Example 17. 0.73 weight parts of this wet pulp ($DP_W$=490) were mixed for 1 h with 0.55 weight parts of urea, 0.01 weight parts of melamine, and 1.9 volume parts of water. This dispersion was filtered and squeezed to obtain 0.6 weight parts of urea-intercalated cellulose. The urea-intercalated cellulose was used for the synthesis of cellulose carbamate under conditions as in Example 1. 0.24 weight parts of white cellulose carbamate ($DP_W$=340, nitrogen content of 1.9 wt. % and relative solubility degree in a range of 4 to 5) were obtained.

Example 19

0.25 weight parts of Ketchikan cellulose pulp with properties as in Example 5 were mercerized and washed out as in Example 17. 0.8 weight parts of wet activated cellulose ($DP_W$=301 and Pd=2.46) were obtained. This activated cellulose was mixed for 1 h at 40° C. with 0.51 weight parts of urea, 0.2 weight parts of guanidine carbonate [($H_2N$—C(NH)—$NH_2$)$_2$ $H_2CO_3$], and 1.69 volume parts of water. The urea-intercalated cellulose dispersion was filtered to obtain 0.6 g of wet pulp used in the synthesis of cellulose carbamate as in Example 1. 0.23 weight parts of white cellulose carbamate ($DP_W$=344, nitrogen content of 4.8%, and relative solubility degree of 5) were obtained.

Example 20

0.2 weight parts of Ketchikan cellulose pulp with properties as in Example 5 were disintegrated and mixed with 4 volume parts of water for 16 h at 20° C. Then the dispersion was transferred into the autoclave for hydrothermal treatment, adding 0.001 weight parts of succinic acid. The hydrothermal treatment was carried out for 4 h at 150° C. Then the autoclave was cooled and the cellulose dispersion was washed with water.

The wet activated cellulose pulp ($DP_W$=313, CrI=72.1%, WRV=59.8%, $E_H$=21.4 kJ/mol and Pd=2.28) was intercalated for 1 h at 40° C. by 0.51 weight parts of urea and water to obtain 3.2 weight parts of dispersion. The urea-intercalated cellulose was filtered and squeezed to obtain 0.6 weight parts of pulp.

The wet urea intercalated pulp were introduced into a reactor for synthesis of cellulose carbamate with 3.2 volume parts of o-xylene (b.p. 142–147° C.), and the synthesis process was carried out as in Example 1 for 2 h at 145° C. The product was purified as in Example 1. 0.2 weight parts of white cellulose carbamate with $DP_W$=319, nitrogen content of 1.5 wt. % and relative solubility degree in a range of 3 to 4 were obtained. The alkaline solution of this product was characterized by α-cellulose content of 5.3 wt. %, sodium hydroxide content of 8.74 wt. %, viscosity at 20° C. of 245 sec, ripeness degree of 4° H.

Example 21

0.2 weight parts of Ketchikan cellulose pulp with properties as in Example 5 were pre-treated as in Example 20. The hydrothermal treatment was carried out in the presence of 0.003 weight parts of formic acid as in Example 20. The activated cellulose was characterized by $DP_W$=203, CrI=71.4%, WRV=61.1% and Pd=2.09. The synthesis of cellulose carbamate was carried out as in Example 20. 0.199 weight parts of white cellulose carbamate with $DP_W$=184, nitrogen content of 1.15 wt. % and relative solubility degree in a range of 3 to 4 were obtained.

Example 22

0.2 weight parts of Ketchikan cellulose pulp with properties as in Example 5 were subjected to hydrothermal treatment in the presence of 0.02 weight parts of citric acid as in Example 20. The activated cellulose was characterized by $DP_W$=202, CrI=73.7%, WRV=64.1%, Pd=2.1, and $E_H$=12.8–17.4 and 18.5–23.7 kJ/mol. The synthesis of cellulose carbamate was carried out as in Example 20. 0.198 weight parts of white cellulose carbamate with $DP_W$=221, nitrogen content of 2.2 wt. %, and relative solubility degree of 3 were obtained. The alkaline solution of this product was characterized by α-cellulose content of 4.65 wt. %, sodium hydroxide content of 8.45 wt. %, ripeness degree of 4.5° H and filter value Kw*=557.

Example 23

0.2 weight parts of Ketchikan cellulose pulp with properties as in Example 5 were hydrothermally treated as in Example 20 in the presence of 0.005 weight parts of citric acid. The cellulose carbamate was synthesized as in Example 20. 0.196 weight parts of white cellulose carbamate with $DP_W$=197, nitrogen content of 1.6 wt. %, and relative solubility degree of 3 were obtained.

Example 24

0.2 weight parts of Ketchikan cellulose pulp with properties as in Example 5 were hydrothermally treated as in Example 20 in the presence of 0.006 weight parts of sulfuric acid. The activated cellulose was characterized by $DP_W$=

258, CrI=75.2%, WRV=69.1%, Pd=2.16 and $E_H$=13.9–16.8 and 18.5–19.7 kJ/mol. The cellulose carbamate synthesis was carried out as in Example 20. 0.2 weight parts of white cellulose carbamate with $DP_W$=215, nitrogen content of 1.5 wt. % and relative solubility degree of 3 were obtained.

Example 25

0.2 weight parts of Ketchikan cellulose pulp with properties as in Example 5 were hydrothermally activated as in Example 20 in the presence of 0.01 weight parts of sodium acetate. The cellulose carbamate synthesis process was carried out as in Example 20.

0.2 weight parts of white cellulose carbamate with $DP_W$=639, nitrogen content of 1.6 wt. % and relative solubility degree in a range of 2 to 3 were obtained.

Example 26

0.2 weight parts of Ketchikan cellulose pulp with properties as in Example 5 were hydrothermally activated as in Example 20 in the presence of 0.001 weight parts of cobalt acetate ($Co(CH_3COO)_2$ $4.H_2O$). The activated cellulose pulp was characterized by $DP_W$=510, CrI=70.8%, WRV=65% and Pd=2.9. The cellulose carbamate synthesis was carried out as in Example 20. 0.19 weight parts of white cellulose carbamate with $DP_W$=510, nitrogen content of 1.5 wt. % and relative solubility degree of 2 were obtained.

Example 27

0.2 weight parts of Ketchikan cellulose pulp with properties as in Example 5 were hydrothermally activated as in Example 20 for 5 h at 150° C. in the presence of 0.001 weight parts of sodium perborate ($NaBO_3$ $4.H_2O$). The synthesis of cellulose carbamate was carried out as in Example 20. 0.198 weight parts of white cellulose carbamate with $DP_W$=498, nitrogen content of 2.3 wt. % and relative solubility degree in a range from 3 to 4 were obtained.

Example 28

0.2 weight parts of Ketchikan cellulose pulp with properties as in Example 5 were hydrothermally activated as in Example 20. 0.4 weight parts of activated pulp characterized by $DP_W$=262, WRV=74.5%, CrI=67.4%, Pd=2.48 were intercalated for 1 h at 40° C. using 0.51 weight parts of urea and 0.2 weight parts of guanidine carbonate [$(H_2N-C(NH)-NH_2)_2.H_2CO_3$] as well as 2.1 volume parts of water. The urea intercalated pulp was filtered and squeezed to obtain 0.6 weight parts of product. The synthesis of cellulose carbamate was carried out as in Example 20. 0.197 weight parts of white cellulose carbamate with $DP_W$=344, nitrogen content of 4.8 wt. %, and relative solubility degree in a range from 3 to 4 were obtained.

Example 29

0.2 weight parts of Swiecie cellulose pulp with properties as in Example 4 were hydrothermally activated as in Example 20 for 2 h at 150° C. in the presence of 0.001 weight parts of hydroxylamine sulfate. The activated pulp was characterized by $DP_W$=285, CrI=66,2%, WRV=79,9%, Pd=2,85 and $E_H$=8,0–21,4 kJ/mol. The urea intercalation and synthesis of cellulose carbamate were carried out as in Example 20. 0.2 weight parts of white cellulose carbamate with $DP_W$=227, nitrogen content of 1.6 wt. %, and relative solubility degree in a range of 3 to 4 were obtained.

Example 30

0.2 weight parts of Swiecie cellulose pulp with properties as in Example 4 were hydrothermally activated as in Example 20 for 2 h at 150° C. in the presence of 0.001 weight parts of ammonium persulfate. The activated pulp was characterized by $DP_W$=290, CrI=63.9%, WRV=77.6%, Pd=2.09, and $E_H$=12.3–21.0 kJ/mol. The urea intercalation and cellulose carbamate synthesis were carried out as in Example 20. 0.199 weight parts of white cellulose carbamate with $DP_W$=215, nitrogen content of 1.4 wt. %, and relative solubility degree of 4 were obtained.

Example 31

0.2 weight parts of Ketchikan cellulose pulp with properties as in Example 5 were hydrothermally activated as in Example 20 in the presence of 0.005 weight parts of ammonium persulfate. The activated pulp was characterized by $DP_W$=343, CrI=62.8%, WRV=63.3%, Pd=2.84, and $E_H$=6.0–20.9 kJ/mol. The urea intercalation and cellulose carbamate synthesis were carried out as in Example 20. 0.197 weight parts of white cellulose carbamate with $DP_W$=343, nitrogen content of 1.3 wt. %, and relative solubility degree of 5 were obtained. The alkaline solution of this product was characterized by α-cellulose content of 5.18 wt. %, sodium hydroxide content of 8.70 wt. %, viscosity at 20° C. of 6 sec, ripeness degree of 6° H and filter value $Kw^*$=358.

Example 32

0.2 weight parts of Ketchikan cellulose pulp with properties as in Example 5 were hydrothermally activated as in Example 20 in the presence of 0.003 weight parts of ammonium persulfate. The activated pulp was characterized by $DP_W$=331, CrI=71.7%, Pd=2.51, $E_H$=8.9–17.9 and 17.1–19.7 kJ/mol. The urea intercalation was carried out as in Example 20. The synthesis of cellulose carbamate was carried out in a mixture of xylene isomers (density 20/4= 0.86 g/cm$^3$; b.p. 166–169° C.) at 135° C. for 2 h as in Example 20. 0.2 weight parts of white cellulose carbamate with $DP_W$=289, nitrogen content of 0.9 wt. %, and relative solubility degree of 4–5 were obtained.

Example 33

0.2 weight parts of Ketchikan cellulose pulp with properties as in Example 5 were hydrothermally activated as in Example 20 in the presence of 0.003 weight parts of hydroxylamine sulfate. The activated pulp was characterized by $DP_W$=325, CrI=71.4%, WRV=78.1%, Pd=2.44 and $E_H$=6.5–13.3 and 18.4–20.2 kJ/mol. The urea intercalation and synthesis of cellulose carbamate were carried out as in Example 20 with synthesis time of 2 h at 145° C. in o-xylene as the organic solvent. 0.195 weight parts of white cellulose carbamate with $DP_W$=303, nitrogen content of 1.3 wt. %, and relative solubility degree of 3–4 were obtained. The alkaline solution of this product was characterized by α-cellulose content of 5.10 wt. %, sodium hydroxide content of 8.69 wt. %, viscosity at 20° C. of 5 sec, ripeness degree of 6.5° H, and filter value $Kw^*$=419.

Example 34

0.2 weight parts of Ketchikan cellulose pulp with properties as in Example 5 were hydrothermally activated as in Example 20 in the presence of 0.003 weight parts of hydroxylamine sulfate. The properties of the activated cellulose were as in Example 33. The urea intercalation and synthesis of cellulose carbamate were carried out as in Example 20 with synthesis time of 4 h at 145° C. 0.198 weight parts of white cellulose carbamate with $DP_W$=307,

Example 35

3.8 weight parts of cellulose pulp of Ketchikan (from spruce wood) characterized by moisture content of 8.5 wt. %, $DP_W$=577, CrI=65.5%, WRV=65.0% and $E_H$=17.3–24.2 kJ/mol, were mixed with 96.2 weight parts of demineralized water at 90° C. for 10 min. Then 3.5 weight parts (on a dry weight basis) of the cellulose dispersion were introduced into a reactor equipped with a stirrer, and 96.5 weight parts of a solution of cellulases originating from *Trichoderma reesei* strain with CMC enzymatic activity of 2.5 U/ml and FPA activity of 0.15 U/ml in acetate buffer with pH=4.8 were added. Enzymatic treatment was carried out at 50° C. for 6 h.

Next, the cellulose dispersion was filtered and washed with warm water (90° C.). As the result of enzymatic activation, activated cellulose pulp with $DP_W$=354, CrI=68.3%, WRV=80.2%, and $E_H$=17.4–19.5 kJ/mol was obtained. 12.2 weight parts of the wet activated pulp containing 72.2 wt. % of water were intercalated as in Example 1 by 8.7 weight parts of urea dissolved in 33.5 volume parts of water. The urea-intercalated pulp was filtered and squeezed to obtain 10.2 weight parts of urea-intercalated cellulose. The synthesis of cellulose carbamate was carried out as in Example 1 for 2 h at 145° C. 3.3 weight parts of cellulose carbamate were obtained. The product was characterized by white color, $DP_W$=320, nitrogen content of 1.4 wt. %, and relative solubility degree of 3–4.

Example 36

3.8 weight parts of cellulose pulp of Ketchikan characterized as in Example 35 with 60.8 weight parts of demineralized water was shredded at 20° C. for 60 min. Then 3.5 weight parts (on a dry weight basis) of the wet cellulose were introduced into a reactor equipped with a stirrer, and 96.5 weight parts of a solution of cellulases originating from *Trichoderma reesei* strain with CMC enzymatic activity of 2.5 U/ml and FPA activity of 0.15 U/ml in a pH=4.8 acetate buffer were added also. Enzymatic treatment was carried out at 50° C. for 18 h.

Next, the cellulose dispersion was filtered and washed as in Example 35. As the result of enzymatic activation, activated cellulose pulp with $DP_W$=369, CrI=69.3%, WRV=83.1%, and $E_H$=17.1–18.1 kJ/mol was obtained.

10.4 weight parts of the wet activated pulp containing 69.3 wt. % of water was intercalated as in Example 1 by 8.9 weight parts of urea dissolved in 34.9 volume parts of water. The urea intercalated pulp was filtered and squeezed to obtain 10.5 weight parts of urea-intercalated pulp. The synthesis of cellulose carbamate was carried out as in Example 1 for 2 h at 145° C. 3.4 weight parts of cellulose carbamate were obtained. The product was characterized by white color, $DP_W$=393, nitrogen content of 2.2 wt. %, and relative solubility degree of 4. The cellulose carbamate obtained had very good solubility in aqueous sodium hydroxide, and the solution was characterized by α-cellulose content=3.7 wt. %, viscosity=5 sec, ripeness degree=7.5° H, and filter value $K_W$*=6101.

Example 37

5.5 weight parts of cellulose pulp of Ketchikan characterized as in Example 35 were grinded at 50° C. for 300 min. Then 5.0 weight parts (on a dry weight basis) of wet cellulose were introduced into a reactor equipped with a stirrer, and 95.0 weight parts of a solution of cellulases originated from *Trichoderma reesei* strain with CMC enzymatic activity of 1.8 U/ml and FPA activity of 0.10 U/ml in an pH=4.8 acetate buffer were added also. Enzymatic treatment was carried out as in Example 36.

Next, the cellulose dispersion was filtered and washed as in Example 35. As the result of enzymatic activation, activated cellulose pulp with $DP_W$=338, CrI=70.1%, WRV=78.5%, and $E_H$=17.3–18.1 kJ/mol was obtained. 15.8 weight parts of the wet activated pulp containing 70.3 wt. % of water were intercalated as in Example 1 by 12.0 weight parts of urea dissolved in 28.0 volume parts of water. Then it was filtered and squeezed to obtain 14.1 weight parts of urea-intercalated pulp. The synthesis of cellulose carbamate was carried out as in Example 1 for 2 h at 145° C. 4.6 weight parts of cellulose carbamate were obtained. The product was characterized by white color, $DP_W$=330, nitrogen content of 1.5 wt-%, and relative solubility degree of 3–4.

Example 38

3.8 weight parts of cellulose pulp of Ketchikan characterized as in Example 35 were hydrothermally treated with 66.2 weight parts of demineralized water at 150° C. for 30 min. at 5 atm pressure. Then 3.5 weight parts (on a dry weight basis) of the wet cellulose were introduced into a reactor equipped with a stirrer, and 96.5 weight parts of a solution of cellulases originated from *Aspergillus niger* strain with CMC enzymatic activity of 2.5 U/ml and FPA activity of 0.35 U/ml in a pH=4.8 acetate buffer were added also. Enzymatic treatment was carried out at 50° C. for 24 h.

Next, the cellulose dispersion was filtered and washed as in Example 35. As the result of enzymatic activation, activated cellulose pulp with average polymerization degree of $DP_W$=392, CrI=69.3%, WRV=69.4%, and $E_H$=18.1–19.7 kJ/mol was obtained. 10.6 weight parts of the wet activated pulp containing 68.9 wt. % of water were intercalated as in Example 1 by 8.4 weight parts of urea dissolved in 34.3 volume parts of water. Then it was filtered and squeezed to obtain 9.9 weight parts of urea-intercalated pulp. The synthesis of cellulose carbamate was carried out as in Example 1 for 2 h at 145° C. 3.3 weight parts of cellulose carbamate were obtained. The product was characterized by white color, $DP_W$=378, nitrogen content of 1.7 wt. %, and relative solubility degree of 3–4.

Example 39

3.8 weight parts of cellulose pulp of Ketchikan characterized as in Example 35 were hydrothermally treated with 66.2 weight parts of demineralized water at 150° C. for 360 min. at 5 atm pressure. Then 3.5 weight parts (on a dry weight basis) of the wet cellulose were introduced into a reactor equipped with a stirrer, and 96.5 weight parts of a solution of cellulases originating from *Aspergillus niger* strain with CMC enzymatic activity of 2.5 U/ml and FPA activity of 0.35 U/ml in a pH=4.8 acetate buffer were added also. Enzymatic treatment was carried out as in Example 35.

Next, the cellulose dispersion was filtered and washed as in Example 35. As the result of enzymatic activation, activated cellulose pulp with $DP_W$=283, CrI=70.0%, WRV=69.0%, and $E_H$=17.2–18.9 kJ/mol was obtained. 11.9 weight parts of wet activated pulp containing 73.5 wt. % of water were intercalated as in Example 1 by 8.7 weight parts of urea dissolved in 33.5 volume parts of water. Then it was filtered and squeezed to obtain 10.2 weight parts of urea-intercalated pulp. The synthesis of cellulose carbamate was carried out as in Example 1 for 2 h at 145° C. 3.0 weight parts of cellulose carbamate were obtained. The product was characterized by white color, $DP_W$=287, nitrogen content of 1.2 wt. %, and relative solubility degree of 4.

Example 40

3.8 weight parts of cellulose pulp of Ketchikan characterized as in Example 35 were hydrothermally treated with 66.2 weight parts of demineralized water at 140° C. for 180 min. at 5 atm pressure. Then 3.5 weight parts (on a dry weight basis) of the wet cellulose were introduced into a reactor equipped with a stirrer, and 96.5 weight parts of a solution of cellulases originating from *Aspergillus niger* strain with CMC enzymatic activity of 1.8 U/ml and FPA activity of 0.25 U/ml in a pH=4.8 acetate buffer were added also. Enzymatic treatment was carried out as in Example 38.

Next, the cellulose dispersion was filtered and washed as in Example 35. As the result of enzymatic activation, activated cellulose pulp with $DP_W$=362, CrI=71.0%, WRV=68.5%, and $E_H$=18.3–19.6 kJ/mol was obtained. 11.3 weight parts of the wet activated cellulose containing 70.4 wt-% of water were intercalated as in Example 1 with 8.4 weight parts of urea dissolved in 34.6 volume parts of water. Then it was filtered and squeezed to obtain 9.9 weight parts of urea intercalated pulp. The synthesis of cellulose carbamate was carried out as in Example 1 for 2 h at 145° C. 3.2 weight parts of cellulose carbamate were obtained. The product was characterized by white color, $DP_W$=314, nitrogen content of 1.5 wt. %, and relative solubility degree of 3–4.

Example 41

3.8 weight parts of cellulose pulp of Ketchikan characterized as in Example 35 were mixed with 57 weight parts of demineralized water and with 0.006 weight parts of perhydrol and hydrothermally treated at 95° C. for 360 min. Then 3.5 weight parts (on a dry weight basis) of the wet cellulose were introduced into a reactor equipped with stirrer, and 96.5 weight parts of a solution of cellulases originating from *Aspergillus niger* strain with CMC enzymatic activity of 2.5 U/ml and FPA activity of 0.35 U/ml in a pH=4.8 acetate buffer were added also. Enzymatic treatment was carried out as in Example 35.

Next, the cellulose dispersion was filtered and washed as in Example 35. As the result of enzymatic activation activated cellulose pulp with $DP_W$=468, CrI=68.9%, WRV=73.8%, and $E_H$=17.8–19.5 kJ/mol was obtained. 11.9 weight parts of the wet activated cellulose containing 71.6 wt. % of water were intercalated as in Example 1 with 8.7 weight parts of urea dissolved in 33.8 volume parts of water. Then it was filtered and squeezed to obtain 10.2 weight parts of urea-intercalated pulp. The synthesis of cellulose carbamate was carried out as in Example 1 for 2 h at 145° C. 3.3 weight parts of cellulose carbamate were obtained. The product was characterized by white color, $DP_W$=415, nitrogen content of 1.4 wt. %, and relative solubility degree of 3.

Example 42

3.8 weight parts of cellulose pulp of Ketchikan characterized as in Example 35 were mixed with 57 weight parts of demineralized water and with 0.6 weight parts of perhydrol at temperature 20° C. for 10 min. Then 3.5 weight parts (on a dry weight basis) of the wet cellulose were introduced into a reactor equipped with a stirrer, and 96.5 weight parts of a solution of cellulases originating from *Aspergillus niger* strain with CMC enzymatic activity of 2.5 U/ml and FPA activity of 0.35 U/ml in a pH=4.8 acetate buffer were added also. Enzymatic treatment was carried out as in Example 36.

Next, the cellulose dispersion was filtered and washed as in Example 35. As the result of enzymatic activation, activated cellulose pulp with $DP_W$=437, CrI=67.5%, WRV=78.2% and $E_H$=18.1–19.8 kJ/mol was obtained. 11.1 weight parts of the wet activated cellulose containing 69.9 wt. % of water was intercalated as in Example 1 with 8.5 weight parts of urea dissolved in 34.7 volume parts of water. Then it was filtered and squeezed to obtain 10.0 weight parts of urea intercalated pulp. The synthesis of cellulose carbamate was carried out as in Example 1 for 2 h at 145° C. 3.3 weight parts of cellulose carbamate were obtained. The product was characterized by white color, $DP_W$=413, nitrogen content of 1.4 wt. %, and relative solubility degree of 3.

Example 43

3.8 weight parts of cellulose pulp of Ketchikan characterized as in Example 35 were shredded as in Example 36 and then hydrothermally treated with demineralized water at 150° C. for 60 min. at 5 atm pressure. Then 3.5 weight parts (on a dry weight basis) of the wet cellulose were introduced into a reactor equipped with a stirrer, and 96.5 weight parts of a solution of cellulases originated from *Trichoderma reesei* strain with CMC enzymatic activity of 2.5 U/ml and FPA activity of 0.15 U/ml in the acetate buffer with pH=4.8 were added also. Enzymatic treatment was carried out as in Example 35.

Next, the cellulose dispersion was filtered and washed as in Example 35. As the result of enzymatic activation, activated cellulose pulp with $DP_W$=300, CrI=69.5%, WRV=87.1%, and $E_H$=16.0–17.1 kJ/mol was obtained. 10.9 weight parts of wet activated cellulose containing 72.6 wt. % of water were intercalated as in Example 1 with 7.6 weight parts of urea dissolved in 35.5 volume parts of water. Then it was filtered and squeezed to obtain 9.0 weight parts of urea intercalated pulp. The synthesis of cellulose carbamate was carried out as in Example 1 for 2 h at 145° C. 3.0 weight parts of cellulose carbamate were obtained. The product was characterized by white color, $DP_W$=380, nitrogen content of 1.5 wt. %, and relative solubility degree of 5. The cellulose carbamate obtained had good solubility in aqueous sodium hydroxide and this solution was characterized by α-cellulose content=4.15 wt. %, viscosity=5 sec, and ripeness degree=7.5° H.

Example 44

3.8 weight parts of cellulose pulp of Ketchikan characterized as in Example 35 were mixed with demineralized water as in Example 35 and shredded as in Example 36. Then the wet cellulose in amount of 3.5 weight parts (on a dry weight basis) were introduced into a reactor equipped with a stirrer, and 96.5 weight parts of a solution of cellulases originated from *Aspergillus niger* strain with CMC enzymatic activity of 2.5 U/ml and FPA activity of 0.35 U/ml in a pH=4.8 acetate buffer were added also. Enzymatic treatment was carried out as in Example 35.

Next, the cellulose dispersion was filtered and washed as in Example 35. As the result of enzymatic activation, activated cellulose pulp with $DP_W$=356, CrI=69.4%, WRV=80.7%, and $E_H$=18.1–19.2 kJ/mol was obtained. 11.1 weight parts of the wet activated cellulose containing 73.2 wt. % of water were intercalated as in Example 1 with 7.6 weight parts of urea dissolved in 35.3 volume parts of water. Then it was filtered and squeezed to obtain 9.0 weight parts of urea-intercalated pulp. The synthesis of cellulose carbamate was carried out as in Example 1 for 2 h at 145° C. 3.0 weight parts of cellulose carbamate were obtained. The product was characterized by white color, $DP_W=381$, nitrogen content of 1.4 wt. %, and relative solubility degree of 3.

Example 45

5.5 weight parts of cellulose pulp of Ketchikan characterized as in Example 35 was shredded as in Example 36 and then mixed with demineralized water and perhydrol as in Example 42 at 60° C. for 60 min. Then 5.0 weight parts (on a dry weight basis) of the wet cellulose were introduced into a reactor equipped with a stirrer, and 95.0 weight parts of a solution of cellulases originated from *Aspergillus niger* strain with CMC enzymatic activity of 5.0 U/ml and FPA activity of 0.70 U/ml in a pH=4.8 acetate buffer were added also. Enzymatic treatment was carried out as in Example 35.

Next, the cellulose dispersion was filtered and washed as in Example 35. As the result of enzymatic activation, activated cellulose pulp with $DP_W=338$, CrI=70.2%, WRV=74.5%, and $E_H=17.5-18.3$ kJ/mol was obtained. 15.7 weight parts of wet activated cellulose containing 69.2 wt. % of water were intercalated as in Example 1 with 12.2 weight parts of urea dissolved in 27.9 volume parts of water. Then it was filtered and squeezed to obtain 14.4 weight parts of urea-intercalated pulp. The synthesis of cellulose carbamate was carried out as in Example 1 for 2 h at 145° C. 4.7 weight parts of cellulose carbamate were obtained. The product was characterized by white color, $DP_W=322$, nitrogen content of 1.7 wt. %, and relative solubility degree of 4.

Example 46

3.8 weight parts of cellulose pulp of Ketchikan characterized as in Example 35 were mixed with demineralized water and perhydrol as in Example 45 and then shredded as in Example 36. Then 3.5 weight parts (on a dry weight basis) of the wet cellulose were introduced into a reactor equipped with a stirrer, and 96.5 weight parts of a solution of cellulases originating from *Trichoderma reesei* strain with CMC enzymatic activity of 5.0 U/ml and FPA activity of 0.30 U/ml in a pH=4.8 acetate buffer were added also. Enzymatic treatment was carried out as in Example 35.

Next, the cellulose dispersion was filtered and washed as in Example 35. As the result of enzymatic activation, activated cellulose pulp with $DP_W=363$, CrI=68.9%, WRV=75.0%, and $E_H=17.8-18.1$ kJ/mol was obtained. 10.9 weight parts of wet activated cellulose containing 70.8 wt % of water were intercalated as in Example 1 with 8.2 weight parts of urea dissolved in 35.1 volume parts of water. Then it was filtered and squeezed to obtain 9.6 weight parts of urea-intercalated pulp. The synthesis of cellulose carbamate was carried out as in Example 1 for 2 h at 145° C. 3.1 weight parts of cellulose carbamate were obtained. The product was characterized by white color, $DP_W=330$, nitrogen content of 1.4 wt. %, and relative solubility degree of 4.

Example 47

3.8 weight parts of cellulose pulp of Ketchikan characterized as in Example 35 were shredded as in Example 36, then hydrothermally treated with demineralized water as in Example 43 and thereafter mixed with demineralized water and perhydrol as in Example 45. Then 3.5 weight parts (on a dry weight basis) of the wet cellulose were introduced into a reactor equipped with stirrer, and 96.5 weight parts of a solution of cellulases originated from *Trichoderma reesei* strain with CMC enzymatic activity of 2.5 U/ml and FPA activity of 0.15 U/ml in a pH=4.8 acetate buffer were added also. Enzymatic treatment was carried out as in Example 35.

Next, the cellulose dispersion was filtered and washed as in Example 35. As the result of enzymatic activation, activated cellulose pulp with $DP_W=301$, CrI=68.7%, WRV=73.9%, and $E_H=17.1-18.2$ kJ/mol was obtained. 11.6 weight parts of wet activated cellulose containing 71.9 wt. % of water were intercalated as in Example 1 with 8.3 weight parts of urea dissolved in 34.7 volume parts of water. Then it was filtered and squeezed to obtain 9.8 weight parts of urea-intercalated pulp. The synthesis of cellulose carbamate was carried out as in Example 1 for 2 h at 145° C. 3.2 weight parts of cellulose carbamate were obtained. The product was characterized by white color, $DP_W=298$, nitrogen content of 1.9 wt. %, and relative solubility degree of 4–5.

We claim:

1. A method of manufacturing cellulose carbamate comprising
    a) preliminarily activating cellulose pulp, by
        i) contacting it with 10 to 20 wt. % aqueous sodium hydroxide solution for 10 minutes to 10 hours at a temperature of 10 to 60° C.,
        ii) aging the solution for 10 minutes to 30 hours at 20 to 80° C.,
        iii) washing out or neutralizing, or both, the excess sodium hydroxide to yield a cellulose with less than 5 wt. % sodium hydroxide, wherein before, during, or after neutralization or after washing, 0.001 to 10 wt. % (based on cellulose) of an activator is added to the cellulose pulp,
    b) intercalating an aqueous solution of urea in the activated cellulose at a temperature of 20 to 60° C. for 10 minutes to 6 hours, wherein the molar ratio of urea to anhydroglucose unit is 0.25:1 to 3:1,
    c) optionally evaporating a portion of the aqueous solution water by drying under atmospheric pressure, reduced pressure, or both at a temperature of 20 to 100° C.,
    d) exchanging the remaining water with a liquid organic solvent,
    e) reacting the activated cellulose with the urea in the liquid organic solvent at 80 to 180° C. for 10 minutes to 10 hours,
    f) separating the reaction product from the liquid solvent,
    g) washing the reaction product with a lower alcohol, or warm and cold water, or combinations thereof,
    h) stripping the residual liquid organic solvent with steam, and
    i) optionally drying the resultant cellulose carbamate.

2. The method according to claim 1, wherein the liquid organic solvent is selected from the group consisting of toluene, o-xylene, p-xylene, pseudocumene, tetraline, and decaline.

3. The method according to claim 1, wherein the activated cellulose pulp is neutralized by organic acids, inorganic acids, or both in the form of solutions, emulsions, dispersions, or a combination thereof.

4. The method according to claim 3, wherein the organic and inorganic acids are selected from a group consisting of acetic acid, formic acid, propionic acid, oxalic acid, sulfuric acid, hydrochloric acid, and nitric acid.

5. The method according to claim 1, wherein the activated cellulose pulp is neutralized by organic anhydrides, inorganic anhydrides, or both.

6. The method according to claim 5, wherein the organic and inorganic anhydrides are selected from the group consisting of acetic acid anhydride, carbon dioxide, sulfur dioxide, and nitrogen dioxide.

7. The method according to claim 1, wherein the activators are nitrogen containing organic compounds.

8. The method according to claim 7, wherein the nitrogen containing organic compounds are selected from the group consisting of biuret, melamine, guanidine, and salts thereof.

9. The method according to claim 1, wherein the activators are salts of organic acids, inorganic acids, or both.

10. The method according to claim 9, wherein the salt of the organic and inorganic acids are selected from the group consisting of sodium acetate, sodium formate, sodium propionate, sodium sulfate, sodium chloride, sodium nitrite, and sodium carbonate.

11. A method of manufacturing cellulose carbamate comprising
   a) preliminarily activating cellulose pulp by hydrothermal treatment in the presence of catalysts for 0.5 to 10 hours at a temperature of 120 to 160° C. under a pressure of up to 5 bar using a weight ratio of cellulose to water of from 1:10 to 1:60,
   b) intercalating an aqueous solution of urea in the activated cellulose at a temperature of 20 to 60° C. for 10 minutes to 6 hours, wherein the molar ratio of urea to anhydroglucose unit is 0.25:1 to 3:1,
   c) optionally evaporating a portion of the aqueous solution water by drying under atmospheric pressure, reduced pressure, or both at a temperature of 20 to 100° C.,
   d) exchanging the remaining water with a liquid organic solvent,
   e) reacting the activated cellulose with the urea in the liquid organic solvent at 80 to 180° C. for 10 minutes to 10 hours,
   f) separating the reaction product from the liquid solvent,
   g) washing the reaction product with a lower alcohol, or warm and cold water, or combinations thereof,
   h) stripping the residual liquid organic solvent with steam, and
   i) optionally drying the resultant cellulose carbamate.

12. A method of manufacturing cellulose carbamate comprising
   a) preliminarily activating cellulose pulp by
      i) pretreating the cellulose pulp mechanically, hydrothermally, by bleaching, or combinations thereof
      ii) enzymatically activating said cellulose pulp at a temperature of 20 to 60° C. for one minute to 48 hours statically, dynamically, or both, with a cellulose concentration in the treated solution in the range of 0.1 to 20 wt %, and
      iii) thereafter washing the enzymatic solution and deactivating the residues of the enzymes by heating to 80 to 90° C.,
   b) intercalating an aqueous solution of urea in the activated cellulose at a temperature of 20 to 60° C. for 10 minutes to 6 hours, wherein the molar ratio of urea to anhydroglucose unit is 0.25:1 to 3:1,
   c) optionally evaporating a portion of the aqueous solution water by drying under atmospheric pressure, reduced pressure, or both at a temperature of 20 to 100° C.,
   d) exchanging the remaining water with a liquid organic solvent,
   e) reacting the activated cellulose with the urea in the liquid organic solvent at 80 to 180° C. for 10 minutes to 10 hours,
   f) separating the reaction product from the liquid solvent,
   g) washing the reaction product with a lower alcohol, or warm and cold water, or combinations thereof,
   h) stripping the residual liquid organic solvent with steam, and
   i) optionally drying the resultant cellulose carbamate.

13. The method according to claim 11, wherein the catalyst is an organic acid, an inorganic acid, or a combination of both in the form of a solution, dispersion, emulsion, or combinations thereof and is added in an amount of from 0.001 to 0.1 weight percent based on cellulose.

14. The method according to claim 13, wherein the catalyst is selected from the group consisting of succinic acid, citric acid, formic acid, acetic acid, propionic acid, and sulfuric acid.

15. The method according to claim 11, wherein the catalyst is a salt in the form of a solution, dispersion, emulsion, or combination thereof in an amount of from 0.001 to 5.0 wt. % based on cellulose.

16. The method according to claim 15, wherein the catalyst is selected from the group consisting of cobalt acetate, zinc acetate, ammonium per-sulfate, cobalt sulfate, ammonium acetate, and hydroxylamine sulfate.

17. The method according to claim 12, wherein the enzymatic activation is accomplished by cellulases, hemicellulases, or a combination thereof.

18. The method according to claim 12, wherein the mechanical pre-treatment of the cellulose pulp is conducted by mixing, shredding, or grinding in water for ten minutes to five hours at a temperature of 20° C. to 90° C.

19. The method according to claim 12, wherein the preliminary activation of the cellulose pulp produces activated cellulose pulp with controlled reactivity toward urea and a controlled polydispersity of less than 2.7.

20. The method according to claim 12, wherein the hydrothermal pre-treatment of the cellulose pulp is conducted in the presence of water for ten minutes to six hours at a temperature of 100–150° C. under a pressure of up to 5 bar with a weight ratio of cellulose to water of 1:5 to 1:100.

21. The method according to claim 12, wherein the bleaching of the cellulose pulp is conducted using hydrogen peroxide in a concentration of 0.1 to 10 g/l at a temperature of 20 to 95° C. for ten minutes to six hours and then washing the pre-treated cellulose pulp.

22. The method according to claim 18, wherein the cellulases originate from *Aspergillus niger* or from *Trichoderma reesei*, with an activity of CMC in the range of 0.1 to 30 U/ml, and activity of FPA in the range of 0.01 to 5 U/ml, and a CMC to FPA activity ratio in the range of 1 to 100.

23. The method according to claim 18, wherein the hemicellulases have an activity of 0.1 to 50 U/ml.

24. The method according to claim 18, wherein enzymatic activation is accomplished by a combination of cellulases and hemicellulases in a weight ratio of 1:0.1 to 1:10.

25. The method according to claim 1, wherein the preliminary activation of the cellulose pulp produces activated cellulose pulp with controlled reactivity toward urea and a controlled polydispersity of less than 2.7.

26. The method according to claim 11, wherein the liquid organic solvent is selected from the group consisting of toluene, o-xylene, p-xylene, pseudocumene, tetraline, and decaline.

27. The method according to claim 11, wherein the preliminary activation of the cellulose pulp produces activated cellulose pulp with controlled reactivity toward urea and a controlled polydispersity of less than 2.7.

28. The method according to claim 12, wherein the liquid organic solvent is selected from the group consisting of toluene, o-xylene, p-xylene, pseudocumene, tetraline, and decaline.

* * * * *